United States Patent
Pasedach

(10) Patent No.: US 9,546,676 B2
(45) Date of Patent: Jan. 17, 2017

(54) THREAD CONNECTION FOR CONNECTING COMPONENTS CONDUCTING HIGH PRESSURE MEDIUM

(71) Applicant: Robert Bosch GmbH, Stuttgart (DE)

(72) Inventor: Sven Pasedach, Hallein (AT)

(73) Assignee: Robert Bosch GmbH, Stuttgart (DE)

(\*) Notice: Subject to any disclaimer, the term of this patent is extended or adjusted under 35 U.S.C. 154(b) by 50 days.

(21) Appl. No.: 14/421,699

(22) PCT Filed: Jul. 29, 2013

(86) PCT No.: PCT/EP2013/065883
§ 371 (c)(1),
(2) Date: Feb. 13, 2015

(87) PCT Pub. No.: WO2014/026846
PCT Pub. Date: Feb. 20, 2014

(65) Prior Publication Data
US 2015/0219139 A1   Aug. 6, 2015

(30) Foreign Application Priority Data

Aug. 16, 2012 (AT) .................................. A 893/2012

(51) Int. Cl.
*F16B 33/00* (2006.01)
*F02M 47/02* (2006.01)
(Continued)

(52) U.S. Cl.
CPC ............ *F16B 33/00* (2013.01); *F02M 47/027* (2013.01); *F02M 55/004* (2013.01);
(Continued)

(58) Field of Classification Search
CPC ...... F16B 33/00; F16L 15/009; F02M 47/027; F02M 55/004; F02M 55/025; F02M 61/168
(Continued)

(56) References Cited

U.S. PATENT DOCUMENTS 2,532,632 A * 12/1950 MacArthur ......... E21B 17/0423
285/332.2
4,426,105 A * 1/1984 Plaquin ................. E21B 17/043
285/3
(Continued)

FOREIGN PATENT DOCUMENTS

AT      509 877 A4   12/2011
AT      510 420 A4    4/2012
(Continued)

OTHER PUBLICATIONS

International Search Report corresponding to PCT Application No. PCT/EP2013/065883, mailed Sep. 23, 2013 (German and English language document) (7 pages).

*Primary Examiner* — Robert A Delisle
(74) *Attorney, Agent, or Firm* — Maginot, Moore & Beck LLP

(57) ABSTRACT

A thread connection, in particular for connecting components of an injection device for internal combustion engines which conduct a high pressure medium, includes a first component and a second component. The first component has an inside thread, and the second component has an outside thread configured to be screwed into the inside thread. The second component is configured such that a face of the second component is tensioned against a contact surface of the first component upon tightening the thread connection. The first component has an axial region between the contact surface and a first convolution of the inside
(Continued)

thread wherefrom material has been removed up to a diameter that exceeds an outside diameter of the inside thread.

14 Claims, 3 Drawing Sheets

(51) Int. Cl.
    *F02M 55/00* (2006.01)
    *F02M 55/02* (2006.01)
    *F02M 61/16* (2006.01)
    *F16L 15/00* (2006.01)

(52) U.S. Cl.
    CPC ........ *F02M 55/025* (2013.01); *F02M 61/168* (2013.01); *F16L 15/009* (2013.01); *F02M 2200/8076* (2013.01); *F02M 2200/856* (2013.01)

(58) Field of Classification Search
    USPC ....................................................... 411/366.1
    See application file for complete search history.

(56) References Cited

U.S. PATENT DOCUMENTS

| | | | |
|---|---|---|---|
| 4,676,529 A * | 6/1987 | McDonald | E21B 17/0423 285/334 |
| 5,906,399 A * | 5/1999 | Noel | E21B 17/042 285/333 |
| 6,173,968 B1 | 1/2001 | Nelson et al. | |
| 7,025,045 B2 * | 4/2006 | Hlousek | F02M 47/027 123/447 |
| 8,336,524 B2 * | 12/2012 | Ganser | F02M 55/025 123/456 |
| 2005/0099008 A1 | 5/2005 | Glover | |
| 2009/0084354 A1 | 4/2009 | Trubnikov | |
| 2010/0170476 A1 * | 7/2010 | Ganser | F02M 55/025 123/447 |
| 2013/0200616 A1 * | 8/2013 | Nussbaumer | F16L 15/00 285/393 |
| 2013/0220271 A1 * | 8/2013 | Graspeuntner | F02M 47/027 123/294 |

FOREIGN PATENT DOCUMENTS

| | | |
|---|---|---|
| AT | 513321 A1 | 3/2014 |
| DE | 7041236 U | 1/1972 |
| DE | 82 21 741 U1 | 11/1982 |
| DE | 195 07 853 A1 | 10/1995 |
| DE | 296 02 088 U1 | 5/1996 |
| DE | 10 2005 004 030 A1 | 8/2006 |
| DE | 10 2011 084 308 A1 | 6/2012 |
| EP | 0 090 871 A1 | 10/1983 |
| EP | 0 230 491 A1 | 8/1987 |
| EP | 0 803 637 A2 | 10/1997 |
| EP | 0 957 305 A2 | 11/1999 |
| JP | 2-12524 U | 1/1990 |
| WO | 2004/005665 A2 | 1/2004 |
| WO | 2009/146475 A1 | 12/2009 |
| WO | 2012/058703 A1 | 5/2012 |

* cited by examiner

US 9,546,676 B2

THREAD CONNECTION FOR CONNECTING COMPONENTS CONDUCTING HIGH PRESSURE MEDIUM

This application is a 35 U.S.C. §371 National Stage Application of PCT/EP2013/065883, filed on Jul. 29, 2013, which claims the benefit of priority to Serial No. AT A 893/2012, filed on Aug. 16, 2012 in Austria, the disclosures of which are incorporated herein by reference in their entirety.

The disclosure relates to a thread connection, in particular for connecting components of an injection device for internal combustion engines which conduct high pressure medium, wherein a first component has an internal thread and a second component has an external thread, which can be screwed into the internal thread, wherein the second component can be clamped against a bearing surface of the first component by means of an end face when the thread connection is tightened and wherein the first component has a material removal zone in an axial region situated between the bearing surface and a first thread turn of the internal thread.

Large storage volumes are necessary in common rail systems for large diesel engines for hydraulic reasons. From this—and also for manufacturing reasons—there result large sealing diameters for the sealing off of the components subject to high pressure. In respect of the thread loading, these large sealing diameters are disadvantageous in the case of screwed joints. On the one hand, high preloading forces must be used and, on the other hand, the dynamic loading on the thread is increased by the pulsating internal pressure loading.

Manufacture of an internal thread for a connection of the type mentioned at the outset is generally carried out in such a way that removal of material is performed in a region situated between the bearing surface and the end of the thread formed thereafter, wherein this is generally implemented in the form of an undercut or a relief cut. The relief cut serves to create a free space representing a runout zone when cutting the thread. In order to avoid weakening of the material, care is generally taken to form the relief cut with as shallow a radial depth as possible.

The only practicable and effective way at the moment of relieving the load on the thread is to increase the thread root radius—to reduce the notching effect—and to enlarge the thread diameter—with which the force transmission area is increased. A positive effect on the load bearing capacity of the screwed joint can furthermore be achieved by improved quality of materials, increasing the thread pitch, especially in the case of highly hardened and tempered screw connections, heat treating techniques, thread manufacture (final hardening and tempering—final rolling) and by means of the lubrication condition. Geometrically, the use of tension nuts and of threads with flank angle differences and large screw-in depths can be helpful for durability.

However, all the feasible measures that have been mentioned are restricted in their effect, especially if high pre-loading forces are required. In particular, there are no technically feasible measures which specifically aim to reduce the loading in the particularly highly loaded first thread turns, i.e. the thread turns adjacent to the bearing surface.

It is therefore the object of the disclosure to improve in a simple way the durability of the thread connection of highly loaded components, especially of those components of an injection device for internal combustion engines which conduct high pressure medium, the intention being, in particular, to achieve a stress reduction in the first thread turns.

To achieve this object, the disclosure makes provision in a thread connection of the type stated at the outset for material to be removed as far as a diameter which exceeds the outside diameter of the internal thread. There is therefore a greater removal of material than with a conventional undercut, whereby a specific reduction in rigidity of the first component at the beginning of the thread and, as a result, a reduction in the stresses in the most highly loaded thread region are achieved. Rigidity increases rapidly over the following thread turns, while the forces to be transmitted also decrease. It is thus possible, through appropriate configuration of the set-back transitional geometry, such as that of an undercut for example, to achieve a significantly more uniform stress distribution over the length of the thread.

A sufficient reduction in rigidity of the first component at the beginning of the thread can preferably be achieved by removing the material as far as a diameter which exceeds the outside diameter of the internal thread at least by twice, in particular at least by three times, the thread depth of the internal thread.

Naturally, the rigidity of the first component cannot be reduced arbitrarily. It should furthermore be taken into account that there are significantly higher stresses at the surface of the material removal zone, in particular of the undercut, and therefore a compromise has to be made between the stresses in the thread and the stresses in the undercut or the corresponding transitional geometry.

In order to avoid an excessive loss of rigidity in the first component, provision is preferably made for the material to be removed as far as a diameter which exceeds the outside diameter of the internal thread by no more than six times, preferably no more than four times, the thread depth of the internal thread.

The stresses in the undercut can be optimized by appropriate shaping, e.g. by means of different radii. In this context, the design is preferably such that the material removal zone has at least two, preferably at least three, regions with radii of curvature that are different from one another.

In general, it is helpful in the concept according to the disclosure if the first component has an adequate wall thickness, allowing the stresses to be better distributed. In the region of the internal thread, the component preferably has a wall thickness which corresponds to at least 20%, preferably at least 50%, of the outside diameter of the internal thread.

To ensure that the reduction in stiffness occurs as far as possible directly in the region of the first thread turn of the internal thread of the first component, it is advantageous if the removal of material starts directly from the end of the internal thread.

As regards the shape of the material removal zone, provision can be made for the material removal zone to be designed with an axial extent which decreases with increasing diameter.

A particularly advantageous use of the disclosure relates to an embodiment in which the first component is an integrated high pressure reservoir of a modular common rail injector and the second component is a holding body of the modular common rail injector.

BRIEF DESCRIPTION OF THE DRAWINGS

The disclosure is explained below by means of an illustrative embodiment shown schematically in the drawing. In said drawing.

DETAILED DESCRIPTION

Figure 1:
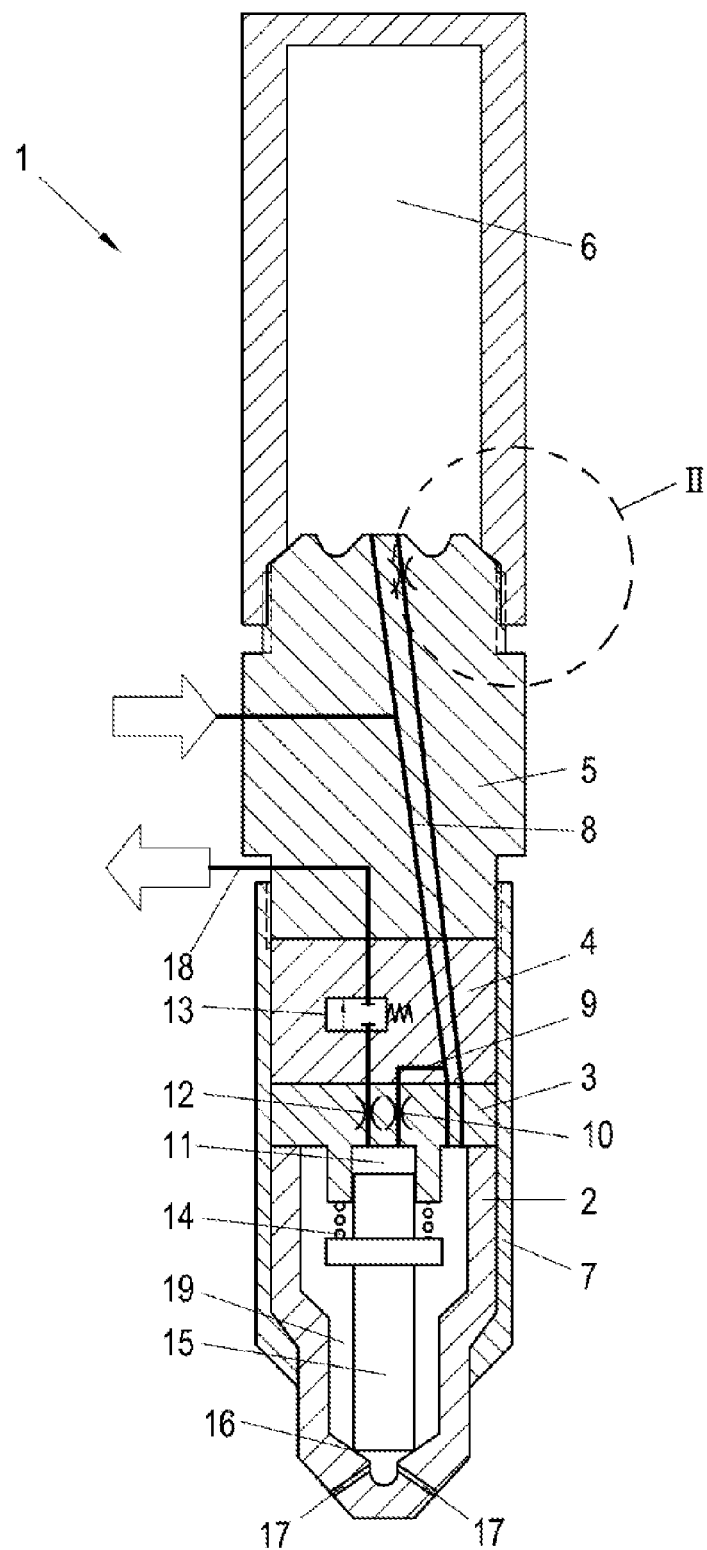
FIG. 1 shows the fundamental construction of a modular common rail injector.

FIG. 1 shows an injector 1, which has an injection nozzle 2, a restrictor plate 3, a valve plate 4, a holding body 5 and a high pressure reservoir 6, wherein a nozzle clamping nut 7 screwed to the holding body 5 holds the injection nozzle 2, the restrictor plate 3 and the valve plate 4 together. In the state of rest, the solenoid valve 13 is closed, with the result that high pressure fuel flows out of the high pressure reservoir 6 via the high pressure line 8, the cross connection 9 and the inlet restrictor 10 into the control space 11 of the injection nozzle 2, but the outflow from the control space 11 via the outlet restrictor 12 is blocked at the valve seat of the solenoid valve 13. The system pressure prevailing in the control space 11 together with the force of the nozzle spring 14 presses the nozzle needle 15 into the nozzle needle seat 16, with the result that the spray holes 17 are closed. If the solenoid valve 13 is actuated, it allows flow via the solenoid valve seat, and fuel flows out of the control space 11, through the outlet restrictor 12, the solenoid valve armature space and the low pressure hole 18, back into the fuel tank (not shown). An equilibrium pressure defined by the flow cross sections of the inlet restrictor 10 and the outlet restrictor 12 is established in the control space 11, said pressure being so small that the system pressure prevailing in the nozzle space 19 is able to open the nozzle needle 15 guided in a longitudinally movable manner in the nozzle body, with the result that the spray holes 17 are opened and an injection takes place.

As soon as the solenoid valve 13 is closed, the outflow path for the fuel through the outlet restrictor 12 is blocked. Via the inlet restrictor 10, fuel pressure is built up again in the control space 11 and produces an additional closing force, which reduces the hydraulic force on the pressure shoulder of the nozzle needle 15 and exceeds the force of the nozzle spring 14. The nozzle needle 15 closes the path to the injection openings 17, and the injection process is ended.

Figure 2:
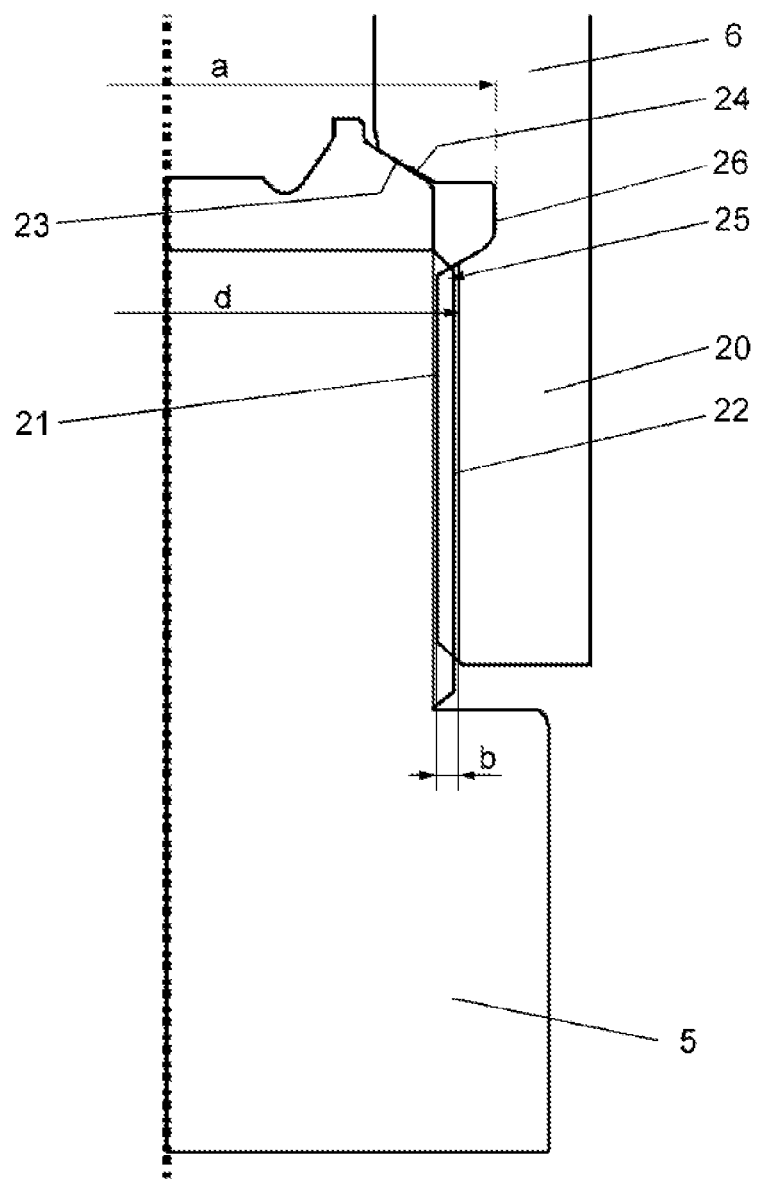
FIG. 2 shows a detail of the thread connection of the holding body to the high pressure reservoir.

FIG. 2 shows an enlarged illustration of detail II in FIG. 1. The high pressure reservoir 6 has a tubular end section 20, which is provided with an internal thread 21. The holding body 5 is provided with an external thread 22, which is screwed into the high pressure reservoir 6, with the result that the holding body 5 interacts with the internal thread 21. As the screw connection is tightened, the conical end face 23 of the holding body 5 is clamped against the conical bearing surface 24 of the high pressure reservoir 6, and sealing between the high pressure reservoir 6 and the holding body 5 is thereby achieved. In the clamped state, the first thread turn 25 is subject to the highest load in conventional embodiments of the thread connection.

According to the disclosure, a material removal zone in the form of an undercut 26 is now provided in the axial region between the end of the internal thread 21 and the bearing surface 24. The undercut 26 results in a removal of material as far as a diameter a which exceeds the outside diameter d of the internal thread 21. In particular, it results in a removal of material as far as a diameter a which exceeds the outside diameter d of the internal thread 21 at least by twice the thread depth b of the internal thread 21.

Figure 3:
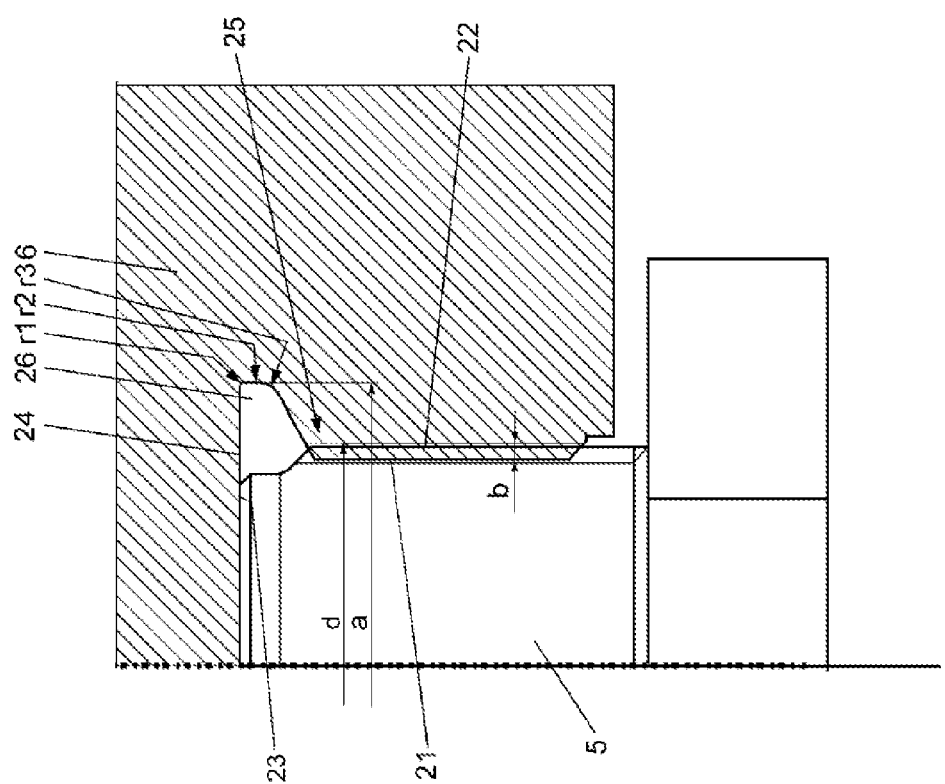
FIG. 3 shows a detail of a thread connection in an alternative embodiment.

In FIG. 3, the disclosure is illustrated schematically in the case of a thread connection with a bearing surface 24 extending at right angles to the thread axis. For comparable parts, the same reference signs are used as in FIG. 2. 6 is used to denote any desired first component and 5 is used to denote any desired second component, wherein the second component 5 is clamped against the bearing surface 24 of the first component 6 with its end face 23 by means of the thread connection comprising the internal thread 21 and the external thread 22. The outside diameter of the internal thread 21 is denoted by d. The thread depth of the internal thread 21 is denoted by b. To relieve the load on the first thread turns of the internal thread 21, an undercut 26 is provided in the region 25. The undercut 26 starts directly from the bearing surface 24 extending at right angles to the thread axis and widens said surface in a radial direction. The bearing surface 24 merges via a first radius r1 of the undercut 26 into a second radius r2 and, immediately thereafter, into a third radius r3. From the third radius r3, the undercut 26 merges into a conical surface, which leads as far as the first thread turn 25 of the internal thread 21. The first radius r1 is significantly smaller than the third radius r3. Here, the second radius r2 can be larger than or the same as r3 or can even approach infinity.

Figure 4:
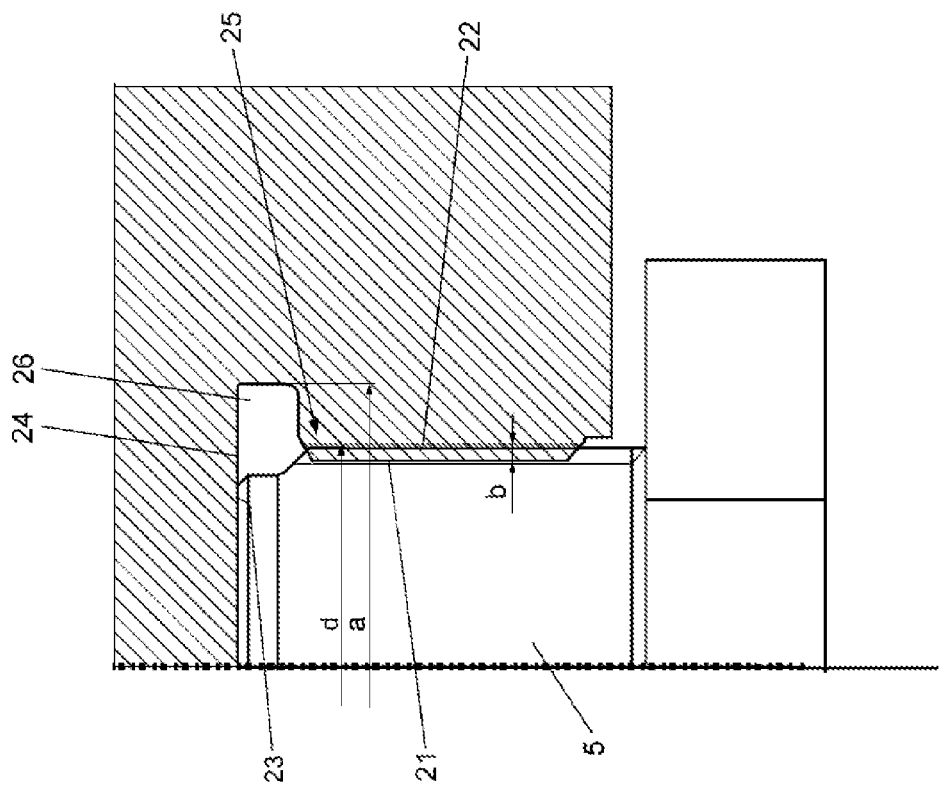
FIG. 4 shows another alternative embodiment.

Whereas the undercut 26 in the embodiment according to FIG. 3 is designed with an axial extent which decreases with increasing diameter, the undercut 26 provided in the alternative embodiment according to FIG. 4 has a substantially constant axial height over its entire radial extent.

The embodiments of the undercut 26 which are shown in FIGS. 3 and 4 can also be implemented in the case of the use illustrated in FIG. 2.

The invention claimed is:

1. A thread connection, comprising:
   a first component that includes:
      an internal thread;
      a bearing surface; and
      a material free zone in an axial region located between the bearing surface and a first thread turn of the internal thread, the material free zone having a diameter that is greater than an outside diameter of the internal thread; and
   a second component that includes:
      an external thread configured to be screwed into the internal thread; and
      an end face;
      the second component configured such that the end face is clamped against the bearing surface when the thread connection is tightened.

2. The thread connection as claimed in claim 1, wherein the diameter of the material free zone exceeds the outside diameter of the internal thread at least by a length that is twice as long as a thread depth of the internal thread.

3. The thread connection as claimed in claim 1, wherein the diameter of the material free zone exceeds the outside diameter of the internal thread at least by a length that is three times a thread depth of the internal thread.

4. The thread connection as claimed in claim 1, wherein:
   the internal thread defines a longitudinally extending thread axis;
   the bearing surface extends at a right angle to the thread axis; and
   an upper portion of the material free zone extends directly radially outwardly from the bearing surface.

5. The thread connection as claimed in claim 1, wherein the material free zone extends directly from an end of the internal thread.

6. The thread connection as claimed in claim 1, wherein the material free zone has at least two regions with respective radii of curvature that are different from each other.

7. The thread connection as claimed in claim 1, wherein the material free zone has an axial extent which decreases with increasing diameter.

8. The thread connection as claimed in claim 1, wherein the material free zone is defined by an undercut.

9. The thread connection as claimed in claim 1, wherein:
the first component is an integrated high pressure reservoir of a modular common rail injector; and
the second component is a holding body of the modular common rail injector.

10. A first component for a thread connection, comprising:
a bearing surface;
an internal thread configured to receive an external thread of a second component to be screwed into the first component and clamped against the bearing surface of the first component: and
a material free zone in a region located between the bearing surface and a first thread turn of the internal thread, the material free zone having a diameter which exceeds an outside diameter of the internal thread.

11. The first component as claimed in claim 10, wherein the diameter of the material free zone exceeds the outside diameter of the internal thread by a length that is at least twice as long as a thread depth of the internal thread.

12. The first component as claimed in claim 10, wherein the material free zone extends directly from an end of the internal thread.

13. The first component as claimed in claim 10, wherein the material free zone has at least two regions with respective radii of curvature that are different from each other.

14. The first component as claimed in claim 10, wherein the material free zone is defined by an undercut.

* * * * *